United States Patent [19]

Ueda

[11] Patent Number: 4,570,727
[45] Date of Patent: Feb. 18, 1986

[54] COLLECTION CHUTE FOR AUTOMATIC WEIGHING APPARATUS

[75] Inventor: Kenji Ueda, Kyoto, Japan

[73] Assignee: Kabushiki Kaisha Ishida Koki Seisakusho, Kyoto, Japan

[21] Appl. No.: 668,895

[22] Filed: Nov. 7, 1984

[30] Foreign Application Priority Data

Nov. 7, 1983 [JP] Japan ................................ 58-172655

[51] Int. Cl.⁴ ..................... G01G 19/22; G01G 21/28; B65G 11/00
[52] U.S. Cl. ....................................... 177/25; 177/58; 193/2 R
[58] Field of Search ............. 177/25, 58, 59, DIG. 12; 193/2 R

[56] References Cited

U.S. PATENT DOCUMENTS

| | | | |
|---|---|---|---|
| 4,141,621 | 2/1979 | Aagard et al. | 156/643 |
| 4,243,476 | 1/1981 | Ahn et al. | 156/643 |
| 4,272,348 | 6/1981 | Cox et al. | 156/643 |
| 4,362,598 | 12/1982 | Griffing | 156/643 |
| 4,399,880 | 8/1983 | Konishi | 177/25 X |
| 4,467,880 | 8/1984 | Minamida et al. | 177/59 |

Primary Examiner—George H. Miller, Jr.
Attorney, Agent, or Firm—Staas & Halsey

[57] ABSTRACT

A collection chute in an automatic weighing apparatus including a pair of first and second upper chutes each having semicircular inner and outer collection members, and a pair of first and second lower chutes having upper ends connected to lower ends of the upper chutes and outlet ports. The first lower chute is connected to the first outer collection member and the second inner collection member. The second lower chute is connected to the second outer collection member and the first inner collection member.

7 Claims, 10 Drawing Figures

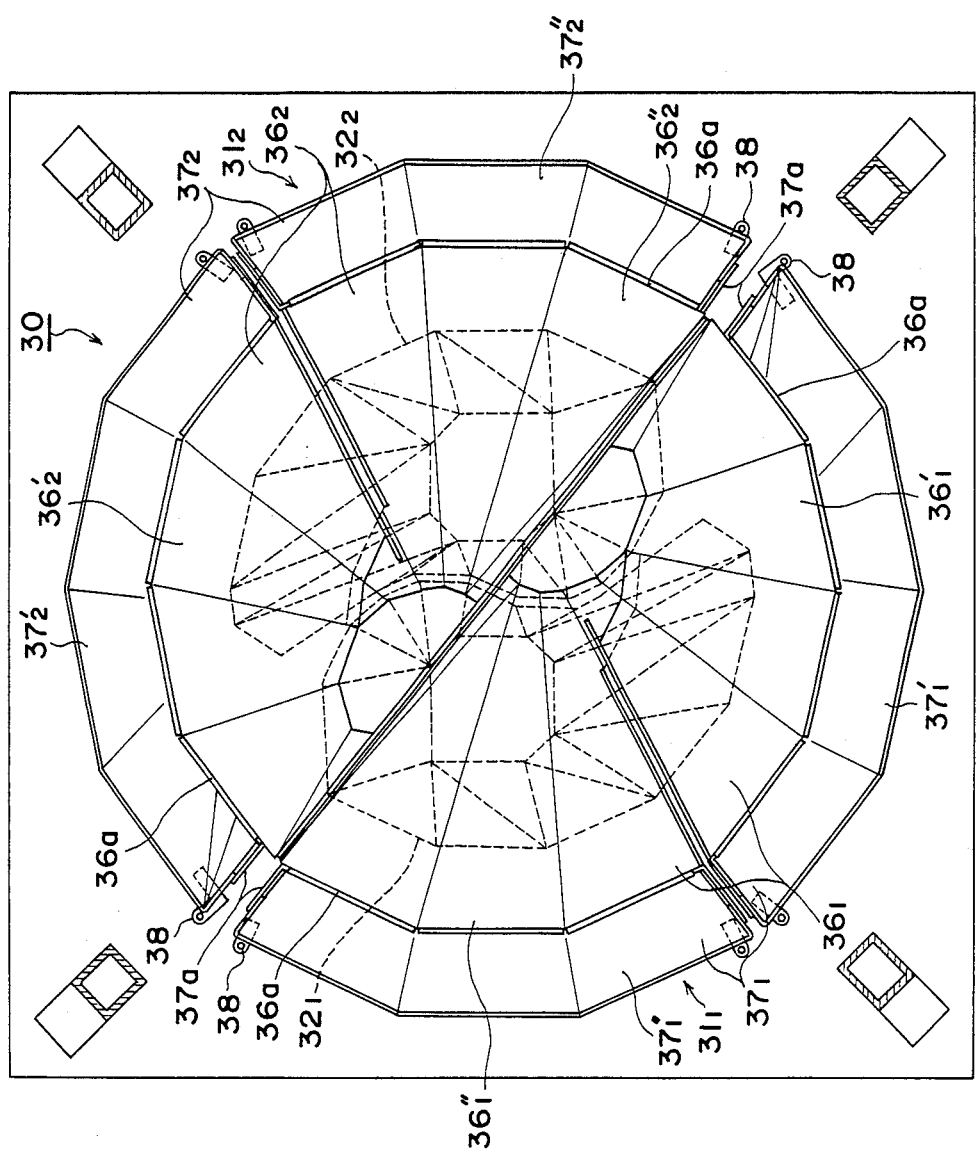

COLLECTION CHUTE FOR AUTOMATIC WEIGHING APPARATUS

CROSS REFERENCE TO RELATED APPLICATIONS

The subject matter of the present application is related to the subject matter of co-pending U.S. patent application Ser. No. 522,564 and co-pending U.S. Patent application, Ser. No. 522,565, both filed Aug. 12, 1982 and both assigned to the assignee of the present application.

BACKGROUND OF THE INVENTION

The present invention relates to a collection chute for use in an automatic weighing apparatus with a combinatorial weighing capability, and more particularly to a collection chute having two collection paths.

Automatic combinatorial weighing apparatus operate by supplying articles to be weighed to a plurality of weighing machines arranged in a circular pattern, effecting a combinatorial arithmetic operation on weights from the weighing machines, selecting a combination of weights which is equal or closest to a target weight, and discharging the articles from the weighing machines which give such a weight combination. For collecting the articles from the weighing machines selected by the combinatorial arithmetic operation and supplying them to a packaging apparatus or the like, the automatic weighing apparatus has a collection chute in the form of a hollow inverted conical body having a wide, open upper end disposed below weighing hoppers of the weighing machines.

The automatic weighing apparatus would have an increased processing ability per unit time by shortening intervals at which weighed articles are discharged. However, articles discharged in a prior weighing cycle and those in a next weighing cyle would tend to get close to each other while they slide down the chute, and eventually mixed together. Therefore, the articles would be difficult to be delivered to the packaging machine in separate quantities.

One solution to the above problem would be to provide a steeply inclined slide surface in the collection chute for causing articles to slide at a higher rate. This arrangement would necessarily result in an increased vertical dimension of the collection chute, and hence the weighing apparatus would be of an increased height.

There has been proposed a collection chute structure D, as shown in FIG. 1 of the accompanying drawings, composed of an inner chute E and an outer chute F. A plurality of weighing hoppers A are arranged in a circular pattern, and each of the weighing hoppers A has an inwardly openable gate B and an outwardly openable gate C. The inner chute E has an upper portion disposed in confronting relation to the gates B for receiving articles discharged from the gates B of the weighing hoppers A, and the outer chute F has an upper portion disposed in confronting relation to the gates C for receiving articles discharged from the gates C. The inner and outer chutes E, F have respective discharge ports E', F' for supplying articles to the packaging apparatus. By alternately or simultaneously opening the gates B, C of the weighing hoppers A, articles are separated into the inner and outer chutes E, F before they are supplied to the packaging apparatus. The above conventional collection chute arrangement is disclosed in U.S. Pat. No. 4,399,880.

As illustrated in FIG. 1, the angles of inclination of slide surfaces of the inner and outer chutes E, F and the lengths of the slide surfaces to the discharge ports are different from each other, resulting in different times required for the articles to slide down the inner and outer chutes E, F. Furthermore, there is a narrow gap G formed above a position where the slide surfaces of the inner and outer chutes E, F intersect. Any articles that happen to enter the gap G are caused to slide down at a reduced speed, and the weighing operation of the weighing apparatus has to be effected to meet the reduced slide rate of retarded articles. As a consequence, the weighing process is slowed.

SUMMARY OF THE INVENTION

It is an object of the present invention to provide a collection chute with two collection paths for an automatic weighing apparatus, the collection chute being designed to allow weighed articles discharged from a plurality of weighing hoppers to slide and gather quickly without any difference in time between the two collection paths, and also to allow weighed articles, successively discharged from the weighing hoppers, to be supplied in separate, unmixed quantities to a packaging apparatus or the like.

According to the present invention, there is provided a collection chute in an automatic weighing apparatus having a plurality of weighing hoppers arranged in a circular pattern, and each weighing hopper having an inner gate and an outer gate. The collection chute has a substantially inverted conical shape and an inner inlet port confronting the inner gates of the weighing hoppers and an outer inlet port confronting the outer gates, the collection chute comprising a pair of first and second upper chutes each having in an upper end, inner and outer inlet ports confronting the inner and outer gates, respectively, of the weighing hoppers. Each of the first and second upper chutes are comprised of a substantially semicircular inner collection member and an outer collection member disposed with a clearance gap defined between the outer collection member and an outer side surface of the inner collection member. The inner collection members have upper ends defining the inner inlet ports confronting the inner gates, the inner and outer collection members jointly defining upper openings serving as the outer inlet ports confronting the outer gates. The collection chute futher comprises first and second lower chutes having upper ends connected to lower ends of the first and second upper chutes and each having outlet ports in a lower ends, the first lower chute being connected to a path defined by the outer and inner collection members of the first upper chute and a path defined by the inner collection member of the second upper chute, the second lower chute being connected to a path defined by the outer and inner collection members of the second upper chute and a path defined by the inner collection member of the first upper chute.

With the collection chute of the above arrangement, the two paths along which articles discharged from the weighing hoppers slide down and are collected together, are of substantially the same length. Since the articles can be discharged at short intervals, and successively discharged articles are not mixed together in the paths, the automatic weighing apparatus has a shorter processing time for each weighing cycle.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a plan view of the collection chute illustrated in FIG. 6.

DESCRIPTION OF THE PREFERRED EMBODIMENTS

Figure 1:
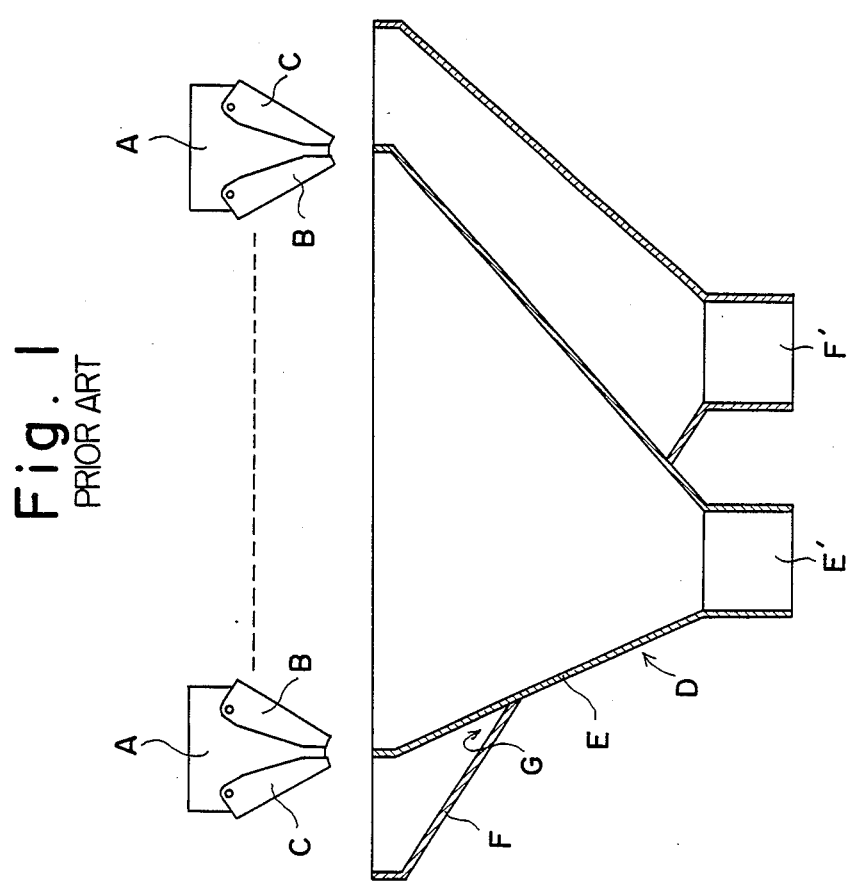
FIG. 1 is a vertical cross-sectional view of a conventional collection chute.
Figure 2:
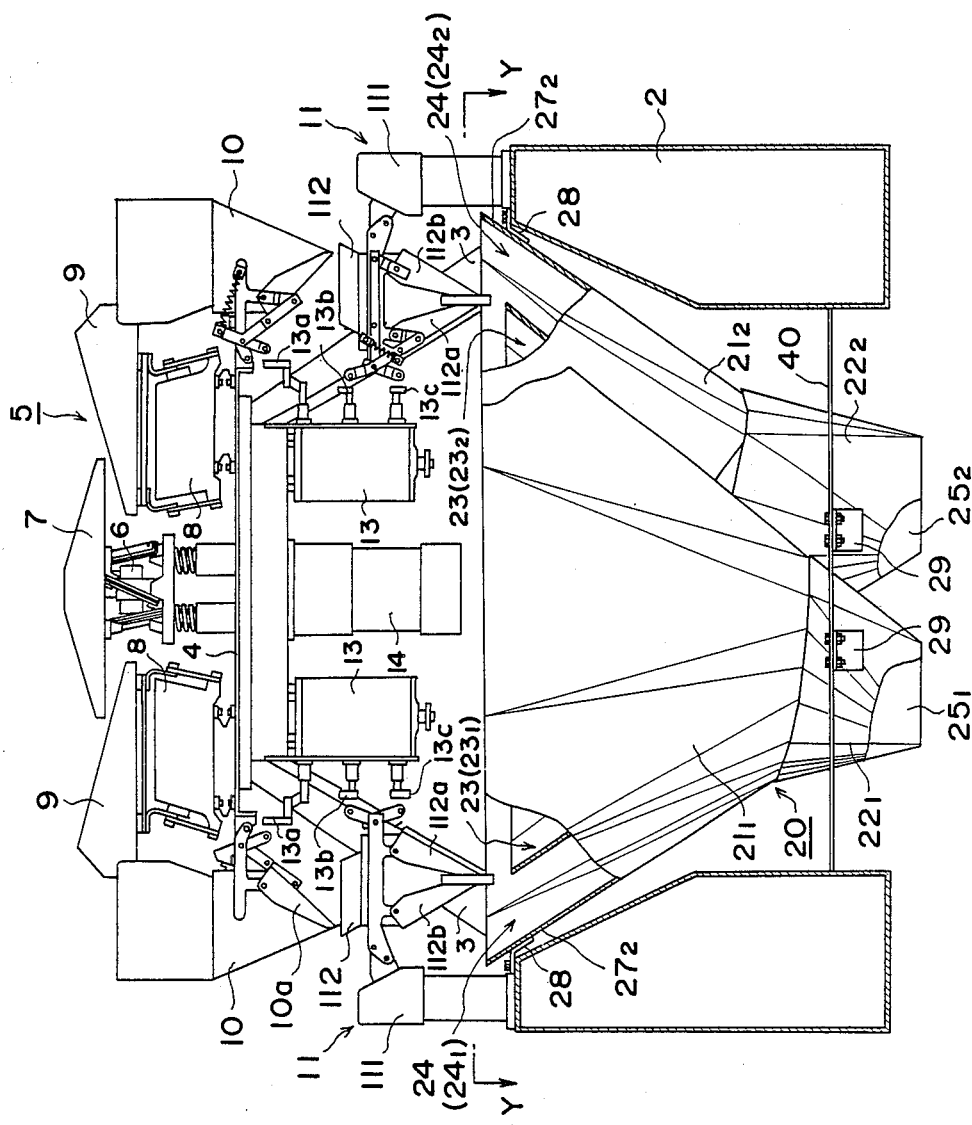
FIG. 2 is a front elevational view, partly in cross section, of a weighing apparatus equipped with a collection chute according to the present invention.

FIG. 2 is illustrative of an automatic combinatorial weighing apparatus equipped with a collection chute according to an embodiment of the present invention.

The automatic combinatorial weighing apparatus has a base 2, a support table 4 supported by a plurality of legs 3 on and above the base 2, and a distributive supply device 5 mounted on the support table 4 for distributing and supplying articles. The distributive supply device 5 is composed of a distribution table 7 mounted on a vibrator 6 centrally positioned on the support table 4, a plurality of radial supply troughs 9 mounted on respective vibrators 8 on the support table 4 and disposed below the outer peripheral edge of the distribution table 7, and a plurality of pool hoppers 10 mounted on the outer peripheral edge of the support table 4 and disposed below radially outer ends of the troughs 9 in radially aligned relation with the troughs 9. The distributive supply device 5 is suppled with articles to be weighed which are delivered onto the distribution table 7 from a charging chute of a supply conveyor (not shown). The distribution table 7 with the articles thereon is vibrated by the vibrator 6 for a prescribed period of time for feeding the articles radially outwardly and then into the troughs 9. The troughs 9 containing articles are vibrated by their respective vibrators 8 for progressively feeding the articles toward the radially outer ends of the troughs 9, from which the articles are supplied to the corresponding pool hoppers 10. Each of the pool hoppers 10 has a single gate 10a which is opened to charge the supplied articles into one of weighing hoppers of weighing machines, described below.

A plurality of weighing machines 11 are mounted on the base 2 in a circular pattern and positioned respectively below the pool hoppers 10. Therefore, there are as many weighing machines 11 as there are pool hoppers 10. Each of the weighing machines 11 is composed of a weight detector 11 and a weighing hopper 112 attached to the weight detector. Each of the weighing hoppers 112 comprises an inner gate 112a openable inwardly toward the center of the weighing apparatus and an outer gate 112b openable outwardly away from the center of the weighing apparatus.

A plurality of hopper opening and closing devices 13 are mounted on a lower surface of the support table 4 in radial alignment respectively with the weighing hoppers 112. Each of the hopper opening and closing devices 13 has three push rods 13a, 13b, 13c for actuating the gate 1a of one of the pool hoppers 10 and the two gates 112a, 112b of one of the weighing hoppers 112. The hopper opening and closing devices 13 are actuated by a motor 14 disposed on a lower central surface of the support table 4 for projecting the push rods 13a, 13b, 13c thereby to open the gates 10a, 112a, 112b, respectively.

A collection chute 20 is disposed below the weighing hoppers 112 and has an overall inverted conical shape. The collection chute 20 is composed of a pair of first and second upper chutes $21_1$, $21_2$, and a pair of first and second lower chutes $22_1$, $22_2$. The collection chute 20 with the four chute components assembled together has at its upper end a substantially circular inner inlet port 23 for receiving articles discharged from the inner gates 112a of the weighing hoppers 112, and an annular outer inlet port, 24 concentric with the inner inlet port 23, for receiving articles discharged from the outer gates 112b of the weighing hoppers 112. The collection chute 20 also has at its lower end a pair of first and second outlet ports $25_1$, $25_2$ for discharging articles.

Figure 3A:
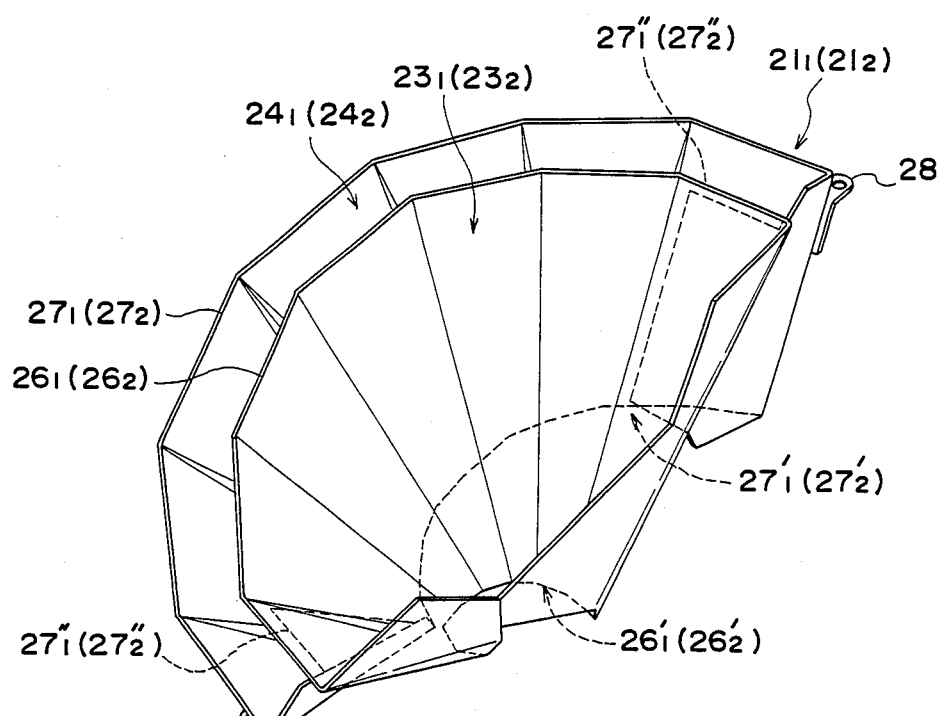
FIG. 3(a) and (b) are exploded perspective views of the collection chute shown in FIG. 2.
Figure 3B:
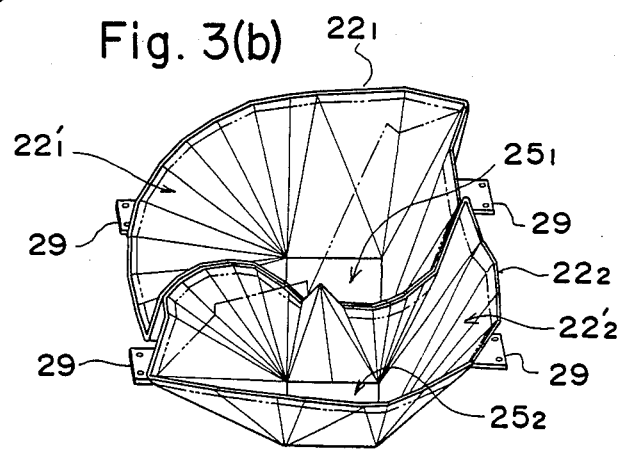
Figure 4:
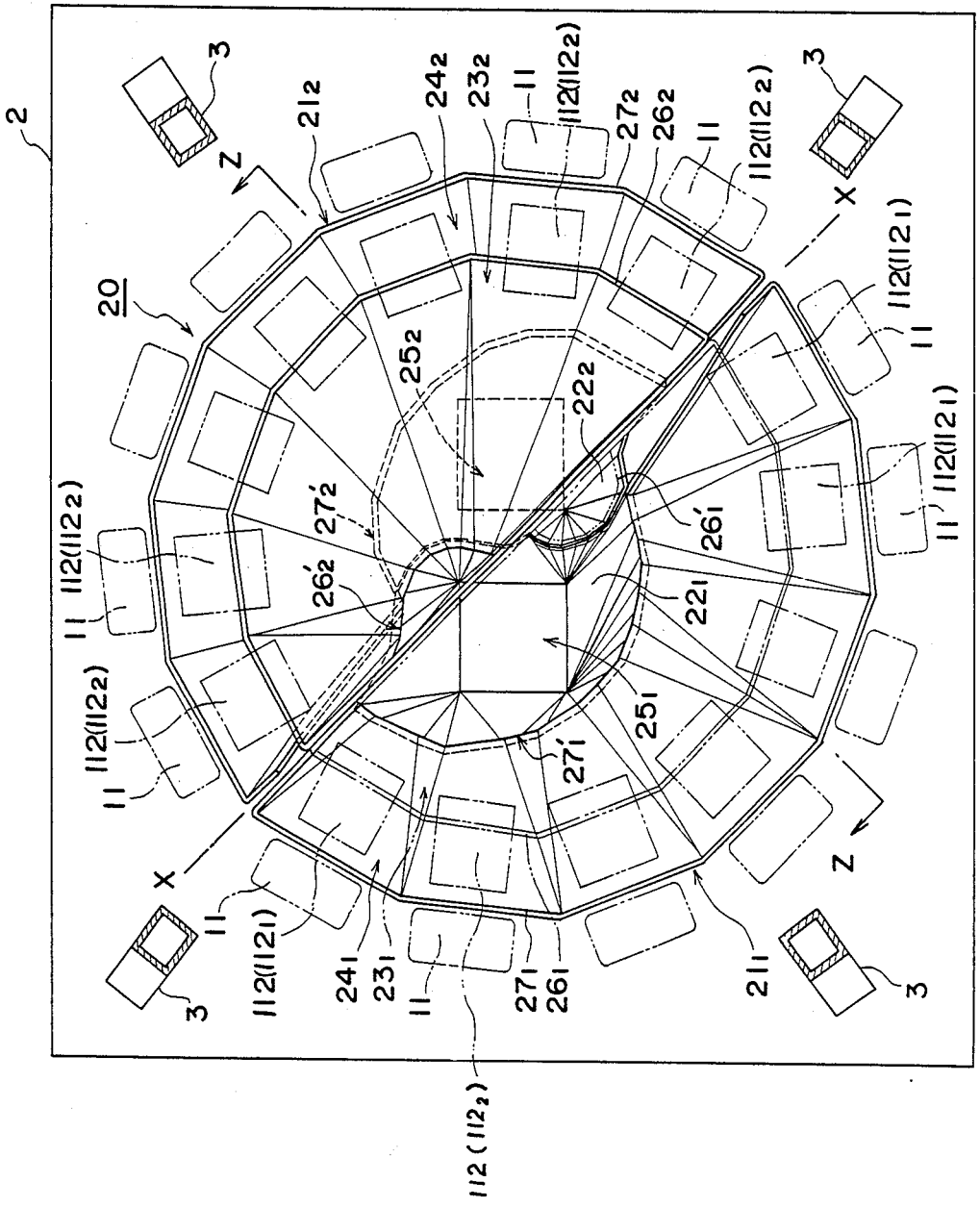
FIG. 4 is a cross-sectional view taken along line Y—Y of FIG. 2.

The chute components will be described with reference to FIGS. 3 through 5. As shown in FIG. 3(a), each of the first and second upper chutes $21_1$, $21_2$ is substantially in the form of an inverted half-conical shape. Since the upper chutes $21_1$, $21_2$ are of substantially the same structure, only one of them is shown in FIG. 3(a). The upper chutes $21_1$, $21_2$ are of double-walled construction and include inner collection members $26_1$, $26_2$ and outer collection members $27_1$, $27_2$, and clearance gaps are defined between the outer collection members and outer side surfaces of the inner collection members $26_1$, $26_2$. The upper end of each of the inner collection members $26_1$, $26_2$ defines half of the inner inlet port 23, and the inner collection members $26_1$, $26_2$ and the outer collection members $27_1$, $27_2$ jointly define halves of the outer inlet port 24. As illustrated in FIG. 4, the inner collection members $26_1$, $26_2$ and the outer collection members $27_1$, $27_2$ have their upper ends opening concentrically, but have lower open ends $26_1'$, $27_1'$, $26_2'$, $27_2'$ opening substantially in point symmetry with respect to the center of a plane X—X in which the inner collection members $26_1$, $26_2$ and the outer collection members $27_1$, $27_2$ mate with each other. As shown in FIG. 3(b), the first lower chute $22_1$ has an upper open end opening $22_1'$ positioned below both the lower opening $27_1'$ defined by the outer and inner collection members $27_1$, $26_1$ of the first upper chute $21_1$, and the lower opening $26_2'$ defined by the inner collection member $26_2$ of the second upper chute $21_2$. Likewise, the second lower chute $22_2$ has an upper open end $22_2'$ opening positioned below both the lower opening $27_2'$, defined by the outer and inner collection members $27_2$, $26_2$ of the second upper chute $21_2$, and the lower opening $26_1'$ defined by the inner collection member $26_1$ of the first upper chute $21_1$. The first and second outlet ports $25_1$, $25_2$ are defined respectively in the lower ends of the first and second lower chutes $22_1$, $22_2$. The upper openings of the first and second lower chutes confront each other at an S-shaped intersection, as shown in FIG. 3(b). With this configuration the upper opening of the first lower chute extends below the lower end of the inner collection member of the second upper chute and the upper opening of the second lower chute extends below the lower end of the inner collection member of the first upper chute, as shown in FIG. 4.

As shown in FIG. 3(a), the outer collection member $27_1$ of the first upper chute $21_1$ has inwardly bent portions $27_1''$, $27_1''$ on its opposite ends, and the outer surfaces of opposite ends of the inner collection member $26_1$ are welded or otherwise secured to the inwardly bent portions $27_1''$, $27_1''$, respectively. In this manner, the outer and inner collection members $27_1$, $26_1$ are integrally joined in a double-walled construction. Similarly, the outer collection member $27_2$ of the second upper chute $21_2$ has inwardly bent portions $27_2''$, $27_2''$ on its opposite ends, and the outer surfaces of opposite ends of the inner collection member $26_2$ are welded or otherwise secured to the inwardly bent portions $27_2''$, $27_2''$, respectively, so that the outer and inner collection members $27_2$, $26_2$ are integrally joined as a double-walled construction.

As shown in FIG. 2, the upper chutes $21_1$, $21_2$ are attached to upper surfaces of the base 2 by means of brackets 28 welded or otherwise joined to upper outer peripheral surfaces of the outer collection members $27_1$, $27_2$ of the upper chutes $21_1$, $21_2$. The lower chutes $22_1$, $22_2$ are attached to an attachment plate 40, mounted on a lower portion of the base 2, by means of brackets 29 welded or otherwise joined to outer peripheral surfaces of the lower chutes $22_1$, $22_2$.

As described above, the collection chute 20 is composed jointly of the upper chutes $21_1$, $21_2$ and the lower chutes $22_1$, $22_2$ which are connected to the upper chutes. As shown in FIG. 5, the collection chute 20 defines a first collection path I composed of a path I' extending from a first half $24_1$ of the outer inlet port 24 of the first upper chute $21_1$ over the outer collection member $27_1$ of the first upper chute $21_1$ and a path I'' extending from a second half $23_2$ of the inner inlet port 23 of the second upper chute $21_2$ over the inner collection member $26_2$ of the second upper chute $21_2$, the paths I' and I'' being joined in the first lower chute $22_1$ and led to the first outlet port $25_1$. The collection chute 20 also defines therein a second collection path II composed of a path II' extending from a second half $24_2$ of the outer inlet port 24 of the second upper chute $21_2$ over the outer collection member $27_2$ of the second upper chute $21_2$ and a path II'' extending from a first half $23_1$ of the inner inlet port 23 of the first upper chute $21_1$ over the inner collection member $26_1$ of the first upper chute $21_1$, the paths II' and II'' being joined in the second lower chute $22_2$ and led to the second outlet port $25_2$. The paths I', II', and the paths I'', II'' are inclined at substantially the same angles, and have substantially the same lengths.

In the illustrated embodiment, as shown in FIG. 4, a total of 14 weighing machines 11 having weighing hoppers 112 are arranged in a circular pattern, and they are divided into first and second groups. Seven weighing machines $112_1$ in the first group are disposed over the first upper chute $21_1$, and seven weighing machines $112_2$ in the second group are disposed over the second upper chute $21_2$.

The operation of the weighing apparatus with the above collection chute 20 will now be described. Articles to be weighed are distributed and supplied from the distribution table 7 through the troughs 9 and the pool hoppers 10 into the weighing hoppers 112 of the weighing machines 11, by which the articles are weighed. A combinatorial processor (not shown) effects a combinatorial arithmetic operation on measured weights from the weighing machines 11, selects a combination of added weights which is closest to a target weight, and actuates the hopper opening and closing devices 13 to open the gates 112a or 112b of the weighing hoppers 112 of weighing machines 11 which give the selection combination of added weights. The gates 12a or 12b of the weighing hoppers 112 in the selected combination are opened to discharge the articles from the opened weighing hoppers 112 into the collection chute 20. The weighing hoppers 112 which have discharged the articles are supplied with new articles for a next weighing cycle from the corresponding pool hoppers 10 with their gates 10a opened by the hopper opening and closing devices 13.

Among the selected weighing machines 11, when the outer gates 112b of the weighing hoppers $112_1$ positioned over the first upper chute $21_1$ of the collection chute 20 are opened, the inner gates 112a of the weighing hoppers $112_2$ positioned over the second upper chute $21_2$ are opened. When weighed articles in a subsequent weighing cycle are to be discharged, the inner gates 112a of the weighing hoppers $112_1$ positioned over the first upper chute $21_1$ and the outer gates 12b of the weighing hoppers $112_2$ positioned over the second upper chute $21_2$ are opened. Therefore, in a first weighing cycle, the articles pass through the first collection path I extending from the first half $24_1$ of the outer inlet port of the first upper chute $21_1$ and the second half $23_2$ of the inner inlet port of the second upper chute $21_2$ toward the first outlet port $25_1$. In a subsequent weighing cycle, the articles pass through the second collection path II extending from the first half $23_1$ of the inner inlet port of the first upper chute $21_1$ and the second half $24_2$ of the outer inlet port of the second upper chute $21_2$ toward the second outlet port $25_2$. Therefore, the articles are discharged alternately through the first and second collection paths I, II and supplied to the packaging apparatus.

As a consequence, the articles weighed in respective weighing cycles in the weighing apparatus are not mixed together in the collection chute 20, and can be supplied in reliably separate quantities to the packaging apparatus at a rate twice that of any collection chute having one collection path. Since the paths I, II are of a symmetrical arrangement, the articles pass through the paths I, II in substantially equal periods of time. The articles are supplied to the packaging apparatus at intervals equal to those of weighing cycles in the weighing apparatus. There is no undersired loss in time as it is not necessary to set the weighing machine cycle intervals to meet any longer period of time in which the articles would otherwise pass through the collection chute.

Figure 5:
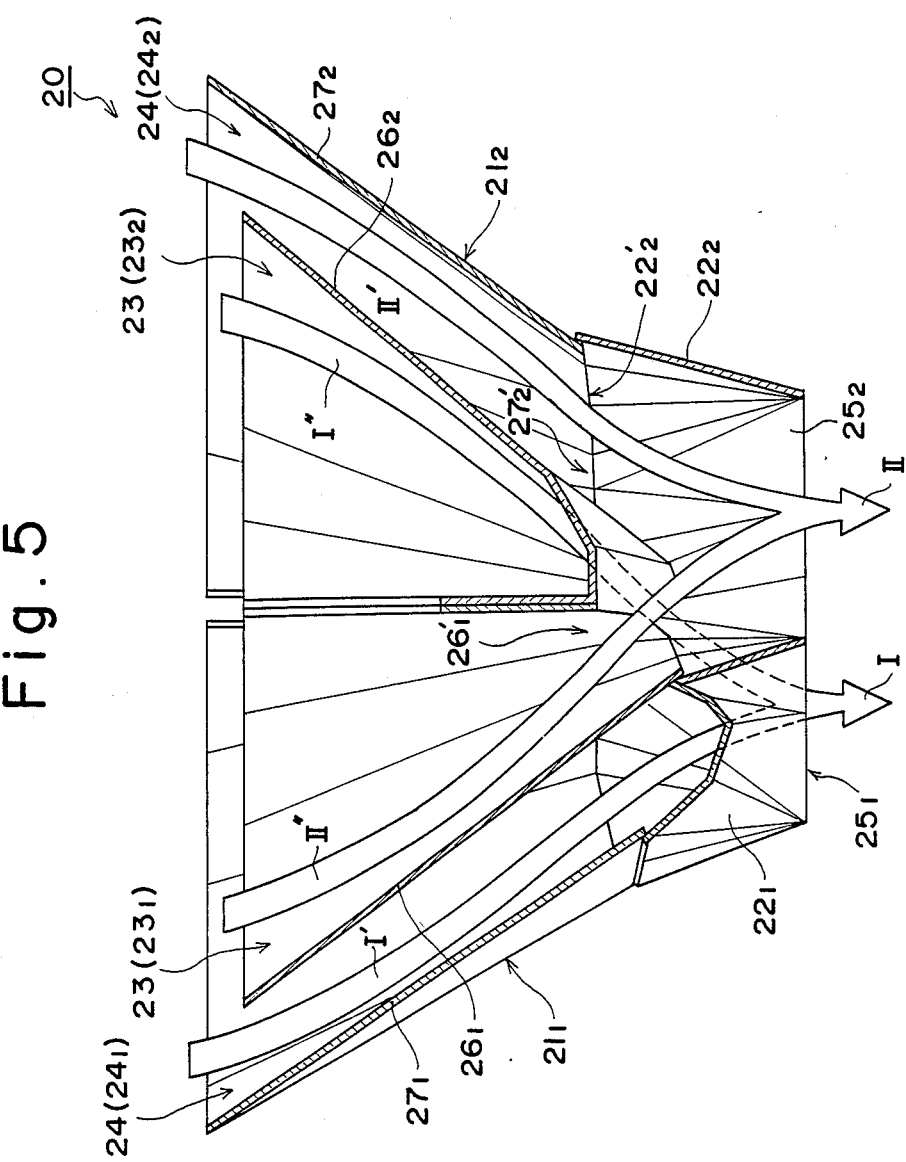
FIG. 5 is a cross-sectional view taken along line Z—Z of FIG. 4.
Figure 6A:
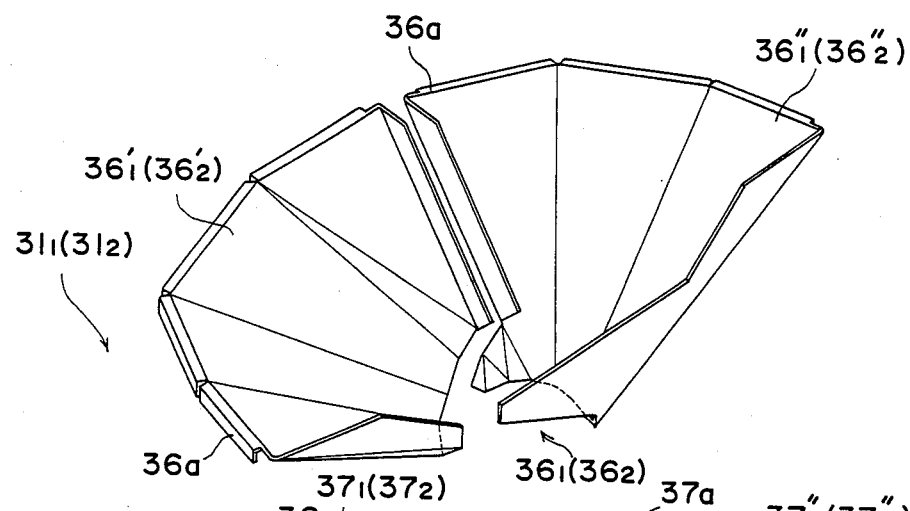
FIGS. 6(a)-(c) are exploded perspective views of a collection chute according to another embodiment of the present invention.
Figure 6B:
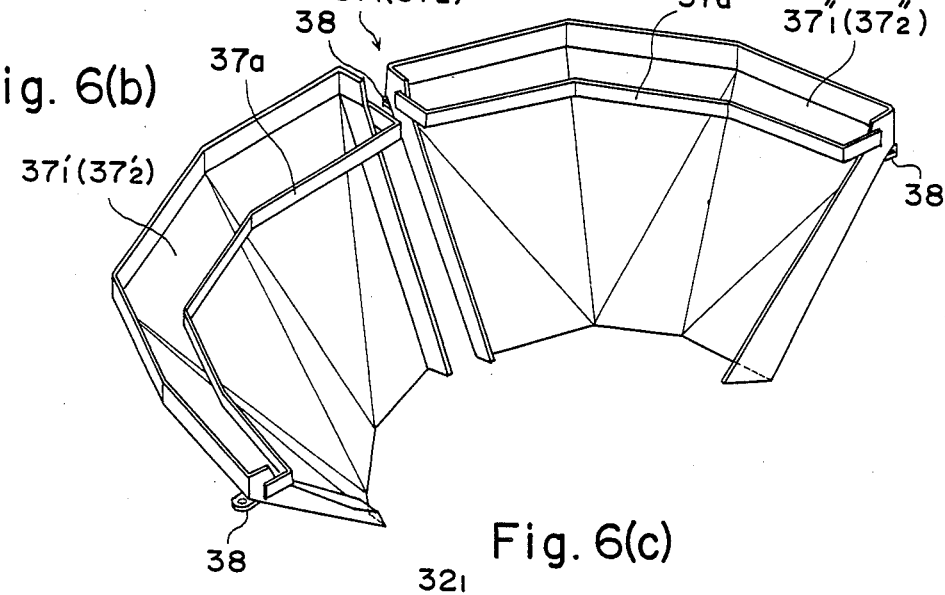
Figure 6C:
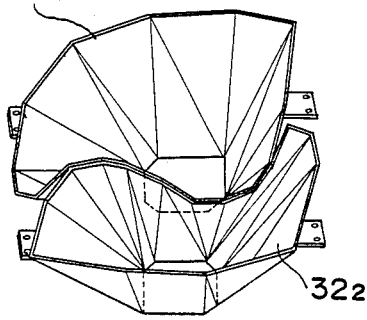

As illustrated in FIG. 5, the paths I'' and II'' cross but do not intersect each other to allow the paths I', I'' and the paths II', II'' in the upper chutes $21_1$, $21_2$, located in opposite relation to each other, to be joined into the collection paths I, II. Since the upper openings $22_1''$, $22_2'$ of the lower chutes $22_1$, $22_2$ are disposed directly below the lower openings $27_1'$, $26_2'$ and $27_2'$, $26_1'$ of the upper chutes $21_1$, $21_2$, the articles will fall substantially vertically from the upper chutes $21_1$, $21_2$ into the lower chutes $22_1$, $22_2$ in which the articles are combined. Thus, the articles will pass through the collection paths I, II in quite a short period of time.

In the foregoing embodiment, articles are weighed in successive cycles of operation in which they are successively supplied to the weighing machines, weighed, the weights are calculated, the articles are then discharged and supplied to the packaging apparatus. The invention is however applicable to another type of weighing apparatus in which articles are supplied to all of the weighing machines 11, two proper combinations of added weights are selected in a single supplying and weighing cycle, and articles from the weighing machines 12 which give such two weight combinations are discharged simultaneously or alternately into the first and second collection paths I, II and then supplied to two packaging apparatus.

A collection chute according to another embodiment will be described with reference to FIGS. 6(a)-(c) and 7. The collection chute of this embodiment, generally designated at 30, has substantially semicircular upper chutes $31_1$, $31_2$ each composed of a plurality of components. More specifically, the first upper chute $31_1$ (or the second upper chute $31_2$) comprises an inner collection member $36_1$ ($36_2$) composed of first and second substantially sectorial components $36_1'$, $36_1''$ ($36_2'$, $36_2''$), and an outer collection member $37_1$ ($37_2$) composed of first and second components $37_1'$, $37_1''$ ($37_2'$, $37_2''$). The components $36_1'$, $36_1''$ ($36_2'$, $36_2''$) of the inner collection member $36_1$ ($36_2$) have outwardly and downwardly bent portions 36a extending along upper edges thereof, and the components $37_1'$, $37_1''$ ($37_2'$, $37_2''$) of the outer collection member $37_1$ ($37_2$) have support arms 37a extending between side edges of these components.

The components $37_1'$, $37_1''$ ($37_2'$, $37_2''$) of the outer collection member $37_1$ ($37_2$) are secured to the base 2 by means of brackets 38 fixed to upper outer peripheral surfaces of these components. The components $36_1'$, $36_1''$ ($36_2'$, $36_2''$) of the inner collection member $36_1$ ($36_2$) are supported at their upper ends by the bent portions 36a engaging the support arms 37a of the components $37_1'$, $37_1''$ ($37_2'$, $37_2''$) of the outer collection member $37_1$ ($37_2$) and at their lower ends held against upper edges of first and second upper lower chutes $32_1$, $32_2$. The first and second chutes $31_1$, $31_2$ are constructed into substantially the same configuration as that of the first and second upper chutes $21_1$, $21_2$ of the previous embodiment by combining the components $36_1'$, $36_1''$, $37_1'$, $37_1''$ and $36_2'$, $36_2''$, $37_2'$, $37_2''$.

Accordingly, the collection chute of the second embodiment has two collection paths. In particular, since the upper chutes are composed of separable plural components, they can easily be mounted on and detached from the base 2 at the time they are to be cleaned or otherwise serviced. While in the illustrated embodiment each of the inner collection members $36_1$, $36_2$ and outer collection members $37_1$, $37_2$ of the first and second upper chutes $31_1$, $31_2$ is divided into two components, it may be divided into more components.

Although a certain preferred embodiment has been shown and described, it should be understood that many changes and modifications may be made therein without departing from the scope of the appended claims.

What is claimed is:

1. A collection chute in an automatic weighing apparatus having a plurality of weighing hoppers arranged in a circular pattern and each having an inner gate and an outer gate, comprising:

first and second upper chutes, each of said first and second upper chutes being composed of a substantially semi-circular inner collection member having upper and lower ends and a semi-circular outer collection member having upper and lower ends and being spaced from the inner collection members to define a clearance gap between said inner collection member and said outer collection member, said upper ends of said inner collection members defining said inner inlet ports confronting said inner gates, said clearance gaps between said inner and outer collection members defining upper openings serving as the outer inlet ports confronting said outer gates; and first and second lower chutes each having an upper end connected to the lower ends of said first and second upper chutes and having a lower end and an outlet port in the lower end, said first lower chute being in communication with a path defined by the clearance gap of said first upper chute and a path defined by the inner collection member of said second upper chute, said second lower chute being in communication with a path defined by the clearance gap of said second upper chute and a path defined by the inner collection member of said first upper chute, the upper ends of the first and second lower chutes confronting each other at an S-shaped intersection so that the upper opening of the first lower chute extends below the lower end of the inner collection member of the second upper chute, and so that the upper opening of the second lower chute extends below the lower end of the inner collection member of the first upper chute.

2. A collection chute according to claim 1, wherein said outer and inner collection members are integrally joined together so that the first and second upper chutes have a double-walled structure.

3. A collection chute according to claim 1, wherein said first and second upper chutes are of a substantially semicircular double-walled construction, said inner and outer collection members are separably coupled, and wherein each of said inner and outer collection members include a plurality of substantially sectoral, separate components.

4. A collection chute for an automatic weighing apparatus comprising:

first and second upper chutes, each upper chute including an outer member having upper and lower ends and an inner member having an upper end spaced from the upper end of the outer chute and a lower end, the spaces between the upper end of the outer member and the upper end of the inner member defining an outer inlet port, the upper end of the inner member defining an inner inlet port; and first and second lower chutes, the first lower chute having an upper opening in communication with the lower end of the outer member of the first upper chute and the lower end of the inner member of the second upper chute and having an outlet port, the second lower chute having an upper opening in communication with the lower end of the outer member of the second upper chute and the lower end of the inner member of the first upper chute and having an outlet port, the upper openings of the first and second lower chutes confronting each other at an S-shaped intersection so that the upper opening of the first lower chute extends below the lower end of the inner member of the second upper chute and so that the upper opening of the second lower chute extends below the lower end of the inner member of the first upper chute.

5. A collection chute according to claim 4, wherein each of the first and second upper chutes has an inverted, bisected frusto-conical shape and wherein the collection chute has an inverted frusto-conical shape.

6. A collection chute according to claim 4, wherein the inner and outer members of the first and second upper chutes are detachably connected.

7. A collection chute according to claim 5, wherein the inner and outer membes of the first and second upper chutes include a plurality of separate components.

* * * * *

UNITED STATES PATENT AND TRADEMARK OFFICE
CERTIFICATE OF CORRECTION

PATENT NO. : 4,570,727

DATED : February 18, 1986

INVENTOR(S) : Ueda

It is certified that error appears in the above-identified patent and that said Letters Patent is hereby corrected as shown below:

Front page, [56], delete 4,141,621    2/1979    Aagard et al. ............ 156/643
    4,243,476    1/1981    Ahn et al. .............. 156/643
    4,272,348    6/1981    Cox et al. .............. 156/643
    4,362,598    12/1982    Griffing ................ 156/643

Col. 6, line 61, "$22_1{}^c{}'$, $222'$" should be $22_1'$, $22_2'$ --.

Signed and Sealed this

Seventeenth Day of June 1986

[SEAL]

Attest:

DONALD J. QUIGG

Attesting Officer      Commissioner of Patents and Trademarks